No. 799,870. PATENTED SEPT. 19, 1905.
W. B. RUBLE.
STONE SAW.
APPLICATION FILED MAR. 28, 1905.

Witnesses:-　　　　　　　　　　Inventor,
F. C. Fliedner　　　　　　　　　William B. Ruble
　　　　　　　　　　　　　By Geo. H. Strong.
　　　　　　　　　　　　　　　　Atty

UNITED STATES PATENT OFFICE.

WILLIAM B. RUBLE, OF RIOVISTA, CALIFORNIA.

STONE-SAW.

No. 799,870.  Specification of Letters Patent.  Patented Sept. 19, 1905.

Application filed March 28, 1905. Serial No. 252,461.

*To all whom it may concern:*

Be it known that I, WILLIAM B. RUBLE, a citizen of the United States, residing at Riovista, in the county of Solano and State of California, have invented new and useful Improvements in Stone-Saws, of which the following is a specification.

My invention relates to improvements in what are known as "granite" or "stone-sawing" machines.

It consists in a combination of parts and in details of construction, which will be more fully explained by reference to the accompanying drawings, in which—

Figure 1:
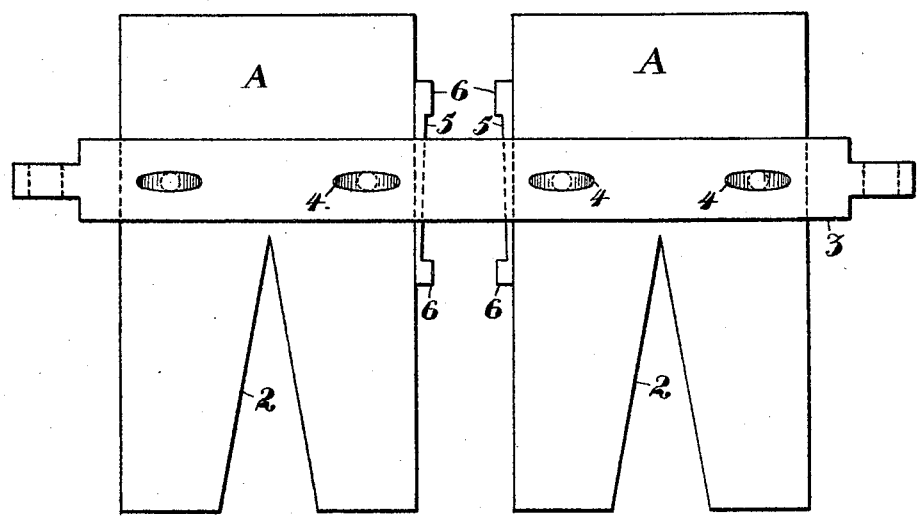
Figure 2:
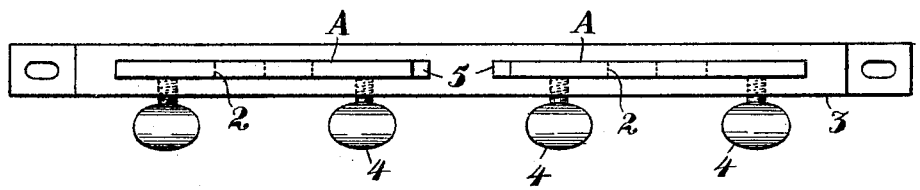

Figure 1 is a side view of my saw-blades. Fig. 2 is a plan view of same.

It is the object of my invention to provide an improvement in the teeth or blades which form the cutting or operating portions of such saw and a means for adjusting and interlocking such blades with the bars or carriers by which they are supported.

As shown in the drawings, A represents two blades which are designed for a saw of this character. These blades are preferably made of heavy iron and of any suitable or desired length sufficient to pass through the thickness of stone to be cut and having a width in their direction of travel sufficient to give them the requisite rigidity and prevent their bending or buckling when at work. These blades, as here shown, are made with substantially parallel sides, and at the bottom they are cut out to form deep V-shaped notches, as shown at 2, these notches being widest at the bottom and converging gradually to a point at the upper end and substantially midway of the width of the blades A. These notches form a convenient space for the reception of the chilled-steel shot which are employed in conjunction with such saws to cut the hard granite or stone, and by reason of the V-shaped notches extending above the upper surface of the stone they form a convenient means for introducing the shot from time to time, as required. These blades are fixed in beams, as at 3. These beams I have here shown made of considerably-greater thickness than that of the blades and having channels slotted vertically through them of sufficient width to receive each blade. These channels are separated from each other a distance approximately equal to the width of the V-shaped channels 2 and the width of the remaining portions of the blades upon each side of said channels—that is, one of the blades A, having the channel 2 cut in it, will have the two bottom edges or legs of substantially the same width as that of the bottom of the channel, and the distance between the edges of the contiguous blades will be about the same. Thus two of said blades will represent a length of about seven feet and will be sufficient for any ordinary cuts.

It will be understood that for single cuts one set of blades and the supporting slotted bar may be employed, and for a number of parallel cuts a sufficient number of parallel saws will be employed.

These saws are reciprocated by crank-wheels and connecting-pitmen well known in the art and not here shown, and the bars 3 are properly guided and supported to maintain the saw-teeth in the desired vertical position. These teeth are secured in the bar 3 by means of binding-screws, as at 4, a sufficient number of these screws being fitted to turn in screw-threads in the sides of the bar 3 to properly clamp the saw. I have here shown two of such screws.

In order to properly lock the saw-teeth at any desired point of adjustment, I have shown wedge-shaped keys 5. These keys have a slightly-tapering shank, and the corresponding edges of the slots through the bar 3 are similarly beveled or tapered. The upper and lower ends of the keys may have heads upon them, as shown at 6, to prevent their being lost.

When it is desired to adjust the teeth, it is only necessary to drive the keys up until the edges of the saw-blades are freed from pressure, release the holding-screws 4, and move the blades to any new adjustment, after which the keys are again driven tight and the screws turned to lock the blades. The keys thus driven lock the saw-blades in place, so that they will not be tilted or twisted from side to side by the pressure of their movement through the stone.

In the reciprocation of the saws as the cut is made the blades at the end run out of the stone, while those in the center are always cutting. The result will be that the inside blades and the inner edges of the outside blades if they do not pass out of the stone will become worn more rapidly than the outer ends. The construction here shown enables me to easily remove the end blades by knocking the keys, loosening the set-screws, and the blades can be reversed or interchanged with the interior blades if more than two are used, and the wear can thus be equalized.

Having thus described my invention, what I claim, and desire to secure by Letters Patent, is—

1. In a stone-saw, blades having substantially parallel vertical edges and channels formed in the lower edges, said channels being substantially midway between the edges of the blades whereby independent legs with substantially horizontal working edges are formed one upon each side of the channels said channels converging upwardly to a meeting-point.

2. Stone-sawing blades having V-shaped channels formed in their lower edges, the greatest width of said channels being less than the width of the blade to form independent legs having working edges arranged substantially at right angles to the sides of the blade.

3. In a stone-saw, independent blades having V-shaped channels in the lower edges, bars having vertical channels cut through them to receive the saw-blades, with intermediate integral spacing portions, keys driven in said channels to lock the blades edgewise, and binding-screws adapted to lock the blades transversely.

4. In a stone-sawing machine, rectangular blades having long convergent channels made in the lower edges, a supporting-bar having slots cut to receive the blades, said slots being longer than the width of the blades, tapering keys fitting said slots adapted to bind and lock the blades in the direction of their width and set-screws passing through the sides of the bar and binding against the sides of the blade.

5. In a stone-sawing machine, the combination with holding-bars having longitudinally-extending spaced channels made vertically through them, of rectangular blades fitting said channels and means for detachably locking the blades in the bar said blades having their lower portions divided into a plurality of legs separated from each other by a V-shaped channel and having working edges disposed substantially at right angles to the sides of said blade.

6. A stone-sawing blade having a substantially V-shaped channel formed in its lower edge, the greatest width of said channel being less than the width of the blade to form independent legs whose working edges are disposed substantially at right angles to the sides of the blade, said channel extending from the said lower edge of the blade to a point above the working area of the blade whereby the space between said legs is accessible for the introduction of a cutting agent during the operation of the blade.

In testimony whereof I have hereunto set my hand in presence of two subscribing witnesses.

WILLIAM B. RUBLE.

Witnesses:
   S. H. NOURSE,
   L. MEININGER.